United States Patent
Levene et al.

(10) Patent No.: US 8,415,629 B2
(45) Date of Patent: Apr. 9, 2013

(54) COMPOSITE SCINTILLATOR INCLUDING A MICRO-ELECTRONICS PHOTO-RESIST

(75) Inventors: Simha Levene, Hanegev (IL); Cornelis R. Ronda, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/615,757

(22) Filed: Sep. 14, 2012

(65) Prior Publication Data
US 2013/0005069 A1    Jan. 3, 2013

Related U.S. Application Data

(62) Division of application No. 12/535,719, filed on Aug. 5, 2009, now Pat. No. 8,294,112.

(60) Provisional application No. 61/087,195, filed on Aug. 8, 2008.

(51) Int. Cl.
*H01L 27/146* (2006.01)

(52) U.S. Cl. ............... 250/362; 250/361 R; 250/370.11; 438/57; 438/69

(58) Field of Classification Search ............... 250/361 R, 250/362, 370.11; 438/57, 69
See application file for complete search history.

(56) References Cited

U.S. PATENT DOCUMENTS

| | | | | |
|---|---|---|---|---|
| 3,467,059 | A | * | 9/1969 | Korner et al. ............... 118/53 |
| 6,282,258 | B1 | | 8/2001 | Stein et al. |
| 2008/0035852 | A1 | | 2/2008 | Nagata et al. |
| 2008/0277588 | A1 | | 11/2008 | Zeitler et al. |
| 2010/0314546 | A1 | * | 12/2010 | Ronda ............... 250/340 |

FOREIGN PATENT DOCUMENTS

| | | |
|---|---|---|
| JP | 57065643 A | 4/1982 |
| WO | 9530236 A1 | 11/1995 |
| WO | 2006097882 A2 | 9/2006 |

OTHER PUBLICATIONS

Daniel, J. H., et al.; Fabrication of high aspect-ratio polymer microstructures for large-area electronic portal x-ray imagers; 2007; Sens Actuators A Phys.; 140(2)185-193.
RD 425005 A, Sep. 1999.

* cited by examiner

*Primary Examiner* — Casey Bryant

(57) ABSTRACT

A radiation-sensitive detector includes a photosensor layer with one or more photosensor dixels and a composite scintillator layer with one or more scintillator dixels optically coupled to the photosensor layer. The composite scintillator layer is formed from a mixture including a scintillator material having a first refractive index corresponding to a first wavelength and a photo-resist used in micro-electromechanical systems production, having a second refractive index corresponding to the first wavelength. The first and second refractive indices are substantially matched, and the composite scintillator layer produces light having the first wavelength and that is indicative of x-radiation detected thereby.

11 Claims, 5 Drawing Sheets

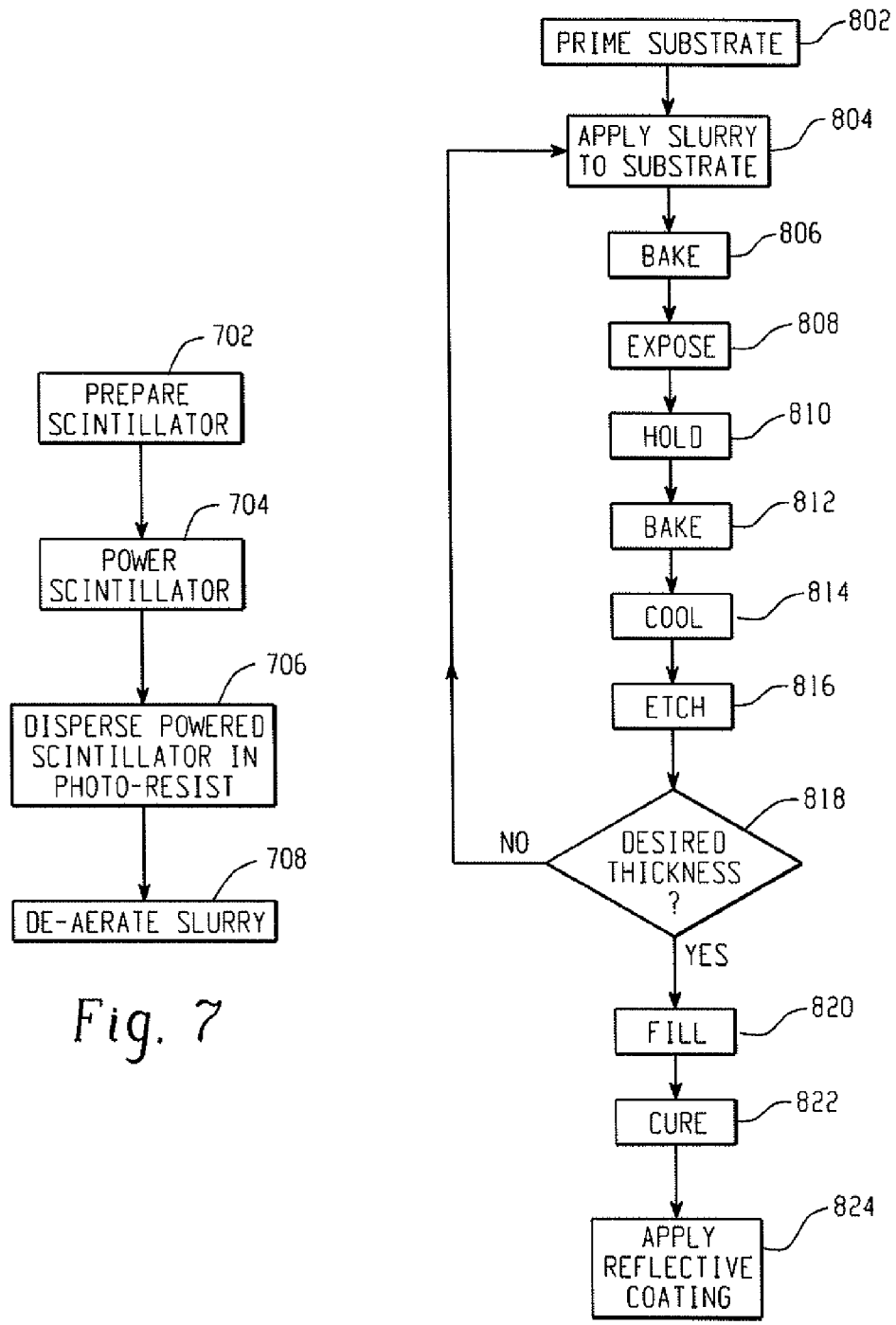

COMPOSITE SCINTILLATOR INCLUDING A MICRO-ELECTRONICS PHOTO-RESIST

CROSS REFERENCE TO RELATED APPLICATIONS

This application is a divisional application of U.S. Ser. No. 12/535,719 filed Aug. 5, 2009 which claims the benefit of U.S. provisional application Ser. No. 61/087,195 filed Aug. 8, 2008, which are incorporated herein by reference.

DESCRIPTION

The following generally relates to scintillators, and finds particular application to computed tomography (CT). However, it is also amenable to other medical imaging applications especially medical radiography, and to non-medical imaging applications, including baggage handling.

A computed tomography (CT) system includes a source of ionizing radiation, which rotates about and emits radiation that traverses an examination region, and a radiation-sensitive detector array which detects the radiation that traverses the examination region. Such a detector array may include one or more rows and/or columns of detector pixels, or dixels. A dixel may include a scintillator dixel optically coupled to a corresponding photosensor dixel. The scintillator dixel receives the ionizing radiation and produces light indicative thereof, and the photosensor dixel receives the light and produces an electrical signal indicative thereof. The signal is reconstructed to generate volumetric image data indicative of a scanned object or subject disposed in the examination region. The volumetric image data may be processed to generate one or more images indicative of the scanned object or subject.

Conventional techniques for manufacturing such a detector array include dicing bulk ceramic or crystal scintillators and gluing the diced scintillators to a photodiode array with optical cement. Unfortunately, ceramic and mono-crystalline scintillators can be expensive, requiring high pressures and/or temperatures in the furnaces used to make them. In addition, structuring technology by dicing and coating with white reflectors is slow, positional accuracy is achieved expensively, and thick coatings subtract from the quantum efficiency of the array. Furthermore, such techniques are reaching their technological limits as far as reducing scintillator and/or photosensor dixel sizes while maintaining or increasing spatial resolution. In addition, mechanical machining may damage the scintillator surface, and annealing to mitigate such damage may not be possible in stages following the damage. Moreover, of the fast scintillators (with decay times less than 40 nanoseconds (ns)) suitable for single-photon spectral CT, many are hygroscopic and decompose over time when exposed to damp conditions, especially to water or other fluids containing water.

Aspects of the present application address the above-referenced matters and others.

According to one aspect, a radiation-sensitive detector includes a photosensor layer with one or more photosensor dixels and a composite scintillator layer with one or more scintillator dixels optically coupled to the photosensor layer. The composite scintillator layer is formed from a mixture including a scintillator material having a first refractive index $n_{11}$ at a first wavelength $\lambda_1$ and a photo-resist having a second refractive index $n_{21}$ at the first wavelength $\lambda_1$ and used in micro-electromechanical systems production. The first and second refractive indices $n_{11}$ and $n_{21}$ are substantially matched, and the composite scintillator produces light having the first wavelength $\lambda_1$ and that is indicative of x-radiation detected thereby.

In another aspect, a method for forming a detector including a composite scintillator layer comprises successively depositing a plurality of layers of a composite scintillator material on a radiation detector substrate, which includes one or more photosensors, via micro-electronics technology, until an aggregate thickness of the plurality of layers of the composite scintillator material reaches a pre-set thickness. The composite scintillator material includes a mixture of a powdered scintillator and a photo-resist, each having a refractive index n in a range between 1.6 and 2.0 in the ultraviolet portion of the electromagnetic spectrum. The composite material produces ultraviolet light, and the refractive index mismatch between the powdered scintillator and the photo-resist is less than ten percent.

In another aspect, an imaging system includes a radiation source that emits radiation that traverses an examination region and a subject or object, and a detector array that detects radiation that traverses the examination region and the subject or object, and generates a signal indicative thereof. The detector array includes a composite scintillator layer, including one or more scintillator dixels that produce first light having a first wavelength $\lambda_1$ in a first wavelength range. The composite scintillator layer includes a micro-electronics photo-resist with a refractive index of about 1.6 to about 1.9 in the first wavelength range 4 and the photo-resist is mixed with a scintillator material with a refractive index matched to the refractive index of the photo-resist. The detector array also includes a photosensor layer, including one or more photosensor dixels sensitive to second light having a second wavelength $\lambda_2$ in a second wavelength range. The detector array also includes a wavelength shifter layer disposed between the photosensor layer and the composite scintillator layer, wherein the wavelength shifter layer receives the first light of wavelength $\lambda_1$ and produces the second light of wavelength $\lambda_2$. A reconstructor reconstructs the signal to generate volumetric image data indicative the subject or object.

Still further aspects of the present invention will be appreciated by those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

FIGS. 7 and 9 illustrate methods for producing composite scintillator materials.

FIGS. 8 and 10 illustrate example methods of employing the composite scintillator materials of FIGS. 7 and 9, respectively, to form a detector array.

Figure 1:
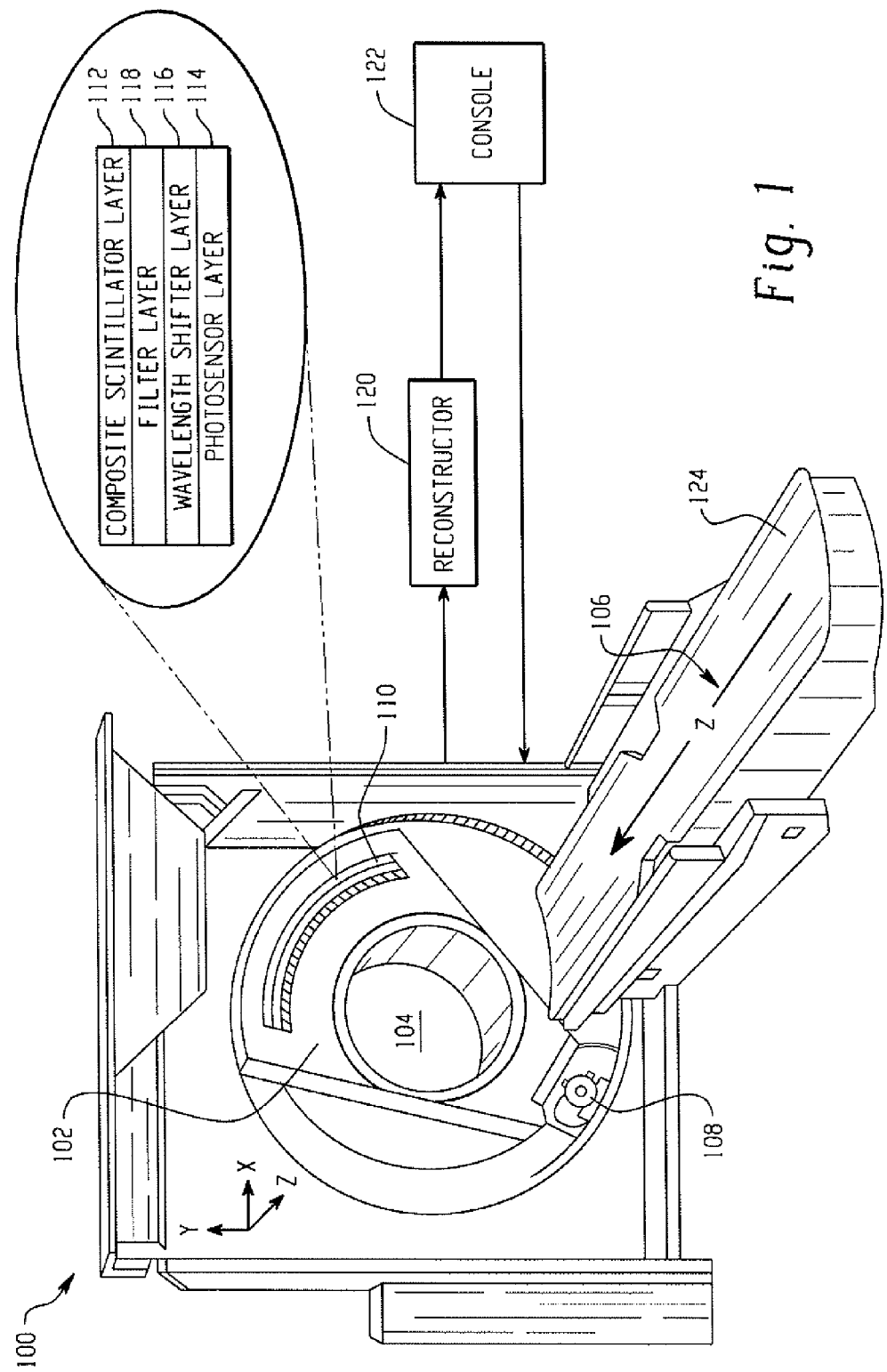
FIG. 1 illustrates an example imaging system.
Figure 2:
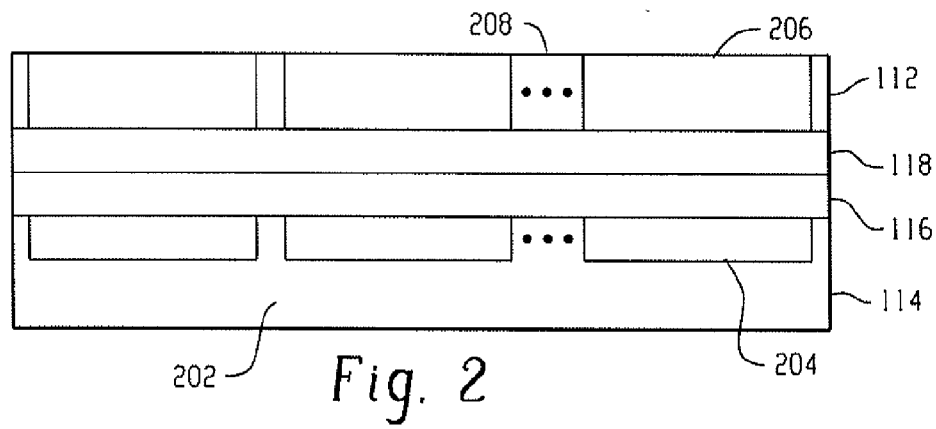
FIGS. 2-5 illustrate example detector array configurations.

With reference to FIG. 1, a computed tomography (CT) system 100 includes a rotating gantry portion 102 which rotates about an examination region 104 around a longitudinal or z-axis 106. The rotating gantry portion 102 supports an x-ray source 108, such as an x-ray tube, that generates and emits radiation that traverses the examination region 104.

A radiation-sensitive detector array 110 detects radiation emitted by the source 108 for a plurality of projection angles so that projections are obtained over at least one hundred and eighty (180) degrees plus a fan angle. The detector array 110 generates a signal or projection data indicative of the detected radiation. The detector array 110 may include an integrating detector that integrates an electrical current or voltage, which is indicative of the detected radiation, over an integration interval or view, or a counting detector that energy-resolves detected photons via two or more energy windows.

The illustrated detector array 110 includes a composite scintillator layer 112 with a plurality of rows and/or columns of scintillator dixels, which receive radiation and generate light indicative thereof. In another embodiment, a single scintillator dixel is employed with the detector array 110. As described in greater detail below, the composite scintillator layer 112 produces ultraviolet (UV) light and includes a composite material such as a mixture of a powdered scintillator and a resin, both having a substantially similar refractive index, n, in the UV portion of the electromagnetic spectrum where the scintillator emits. Examples of suitable resins include, but are not limited to, relatively high n (e.g., ~1.6 to 2.0) photo-resists including epoxy resin photo-resists used in micro-electronics production.

The illustrated detector array 110 also includes a photosensor layer 114, including one or more rows and columns of photosensor dixels, which receive the light produced by the composite scintillator layer 112 and generate an electrical signal, such as a current or voltage, indicative of the light. In one non-limiting example, the detector array 110 includes sixteen (16) rows of sixteen (16) photosensor dixels, rendering a detector array 110 with two-hundred and fifty-six (256) photosensor dixels. Other numbers of photosensor dixels are also contemplated. The photosensor dixels may include conventional photo-diodes, avalanche photo-diodes, or other photosensors.

A wavelength shifter layer 116 shifts the wavelength $\lambda_1$ of the light generated by the composite scintillator layer 112. In one non-limiting instance, the wavelength shifter layer 116 shifts the wavelength to produce light having a wavelength $\lambda_2$ corresponding to the spectral sensitivity of the photosensor layer 114 or another wavelength. In the illustrated example, this includes converting UV light into corresponding visible light. Of course, the wavelength shifter layer 116 is not limited to only shifting UV light to visible light. In other embodiments, the wavelength shifter layer 116 used, if at all, shifts the wavelength of the received light to a wavelength $\lambda_2$ suitable for the photosensor layer 114.

A filter layer 118 provides a barrier that mitigates non-UV light, such as light emitted by the wavelength shifter in a backward direction, from entering the composite scintillator layer 112 through the wavelength shifter layer 116. In one embodiment, this filter 118 reflects the light forwardly in the direction of the photosensor layer 114. A one- or two-dimensional anti-scatter grid may be disposed between the radiation sensitive detector array 110 and the radiation source 108. Such an anti-scatter grid mitigates or reduces detection of scattered radiation relative to a configuration in which an anti-scatter grid it omitted.

A reconstructor 120 reconstructs the projection data generated by the detector array 110 to generate volumetric image data. The volumetric image data is indicative of objects within the examination region 104. A computer serves as an operator console 122. The console 122 includes a human readable output device such as a monitor or display and an input device such as a keyboard and mouse. Software resident on the console allows the operator to control and interact with the scanner 100, for example, through a graphical user interface (GUI). A support 124 such as a couch supports a patient or object in the examination region 104. The support 124 is movable so as to guide the object or subject within respect to the examination region 104 in the x, y, and z directions.

It is to be appreciated that employing the composite scintillator layer 112 allows for production of high resolution (sub-millimeter) dixels with fast decay times (e.g., less then 40 nanoseconds) using micro-electronics technology such as micro-electromechanical systems (MEMS) technology. In addition, matching the refractive indices of the scintillator material and the photo-resist in the composite material (e.g., within 10% or less) may result in a clear, non-scattering composite scintillator layer 112 with high output light efficiency. Furthermore, the photo-resists stabilize the composite scintillator layer 112, which may mitigate absorption of fluids including water that can cause hygroscopic scintillators to decompose or deterioration of the scintillator by atmospheric oxidation.

FIGS. 2-5 illustrate example detector array configurations. Initially referring to FIG. 2, the photosensor layer 114 includes a substrate 202 and N photosensors 204, wherein N is an integer, which detect light in the visible light spectrum. The N photosensors 204 are coated with the wavelength shifter layer 116, which converts UV light to visible light. In one instance, the wavelength shifter layer 116 has a decay time of less than 40 nm, such as 35 nm or less. The filter layer 118 resides on an opposing side of the wave shifter layer 116 with respect to the photosensor layer 114 and mitigates emission of visible light of wavelength $\lambda_2$ backwards into the composite scintillator layer 112. The filter layer 118 may include a UV wavelength pass filter, which passes UV light, but which filters out visible light. The filter layer 118 may include p-terphenyl, p-quaterphenyl, 2,5-diphenyl-furan and/or other material.

The scintillator layer 112 includes N scintillator dixels 206, with at least one scintillator dixel that corresponds to at least one of the photosensor dixels 204. A scintillator dixel includes a composite material formed using a scintillator material and a micro-electronics photo-resist with a matching refractive index as described herein. The scintillator dixels can be formed in various shapes (e.g., square, hexagonal, pentagonal, etc.), sizes and/or orientations, or with staggered dixels in which scintillator dixels in neighboring columns and/or rows are offset from each other in the x and/or z directions by a fraction of a dixel, which may improve spatial resolution. In one instance, the scintillator layer 112 has a decay time in a range of about 10 nanoseconds (ns) to about 30 ns, such as 19 ns. It is to be appreciated that a template for an array of the scintillator dixels 206 can be pre-formed photographically or otherwise on the surface of substrate 202. This allows an array of the scintillator dixels 206 to be precisely registered with the N photosensors 204 of the photosensor layer 114.

In one instance, the composite scintillator layer 112 is deposited on the substrate 202 layer-by-layer using standard or conventional micro-electronic technology. Each layer may be dried and structured by photographic or other exposure and etching, followed by a final baking of the complete structure. The side walls of the micro-structure may be smoothed using focused ion beam (FIB) milling, which may mitigate light scattering, resulting from scalloped side walls, which may reduce surface reflectivity. In one instance, the side-walls may be smoothed to better than 10 nm using FIB milling. The side walls may also be chemically coated with metal to form specular mirrors, coated with supple, low-index, silicone resins or plastics or with air to form fiber optic light guides, enabling non-dixellated scintillators. Gaps or material free regions between scintillator dixels can be filled with a filler 208 such as a reflective material like a high-index colorless powder such as barium sulphate BaSO4 immersed in a low-index resin such as silicone or other materials that do not absorb in the UV range.

Figure 3:
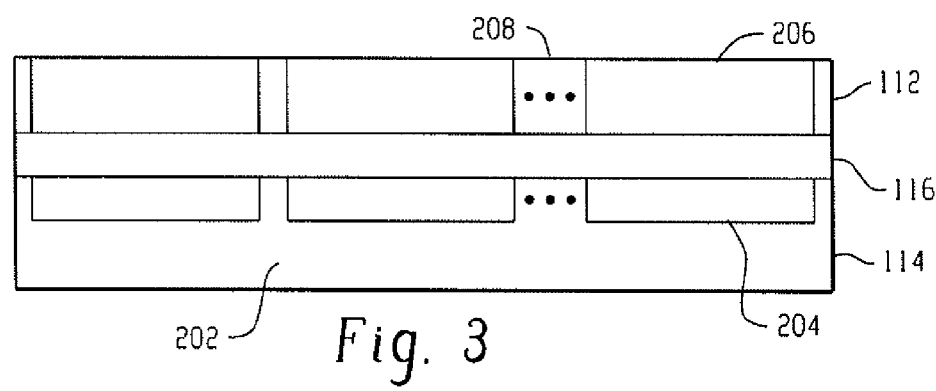
Figure 4:
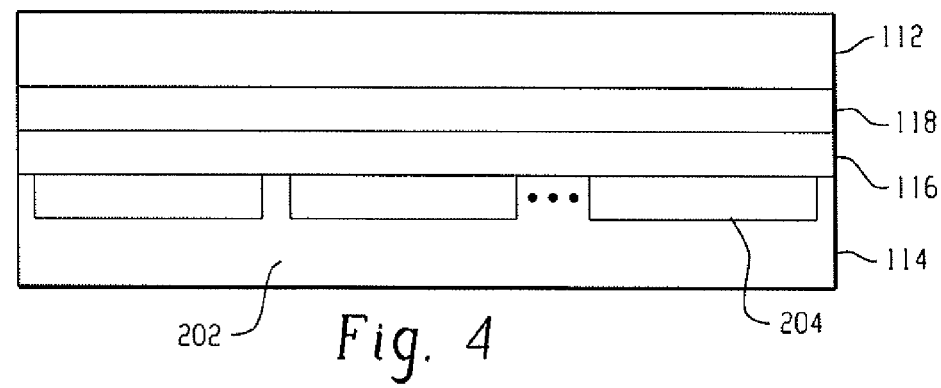
Figure 5:
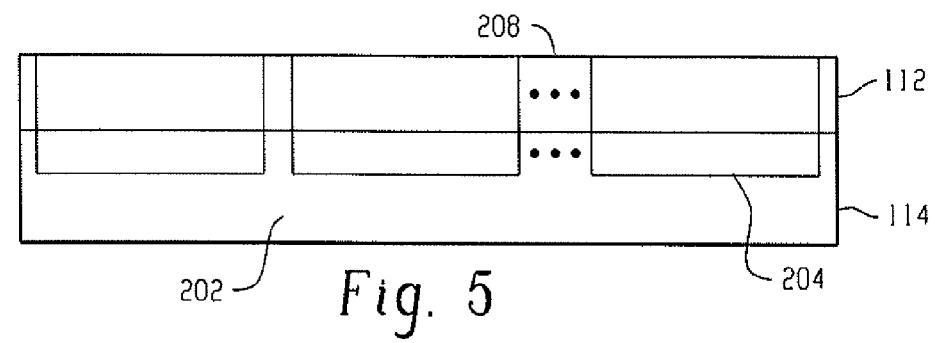

In FIG. 3, the filter layer 118 is omitted. In FIG. 4, the composite scintillator layer 112 includes a single scintillator dixel, and the reflective material 208 is omitted. In FIG. 5, the N photosensors 204 are sensitive to UV light, and the composite scintillator layer 112 emits light in the UV spectrum. Thus $\lambda_1 = \lambda_2$, and both the filter layer 118 and the wavelength shifter layer 116 can be omitted.

Figure 6:
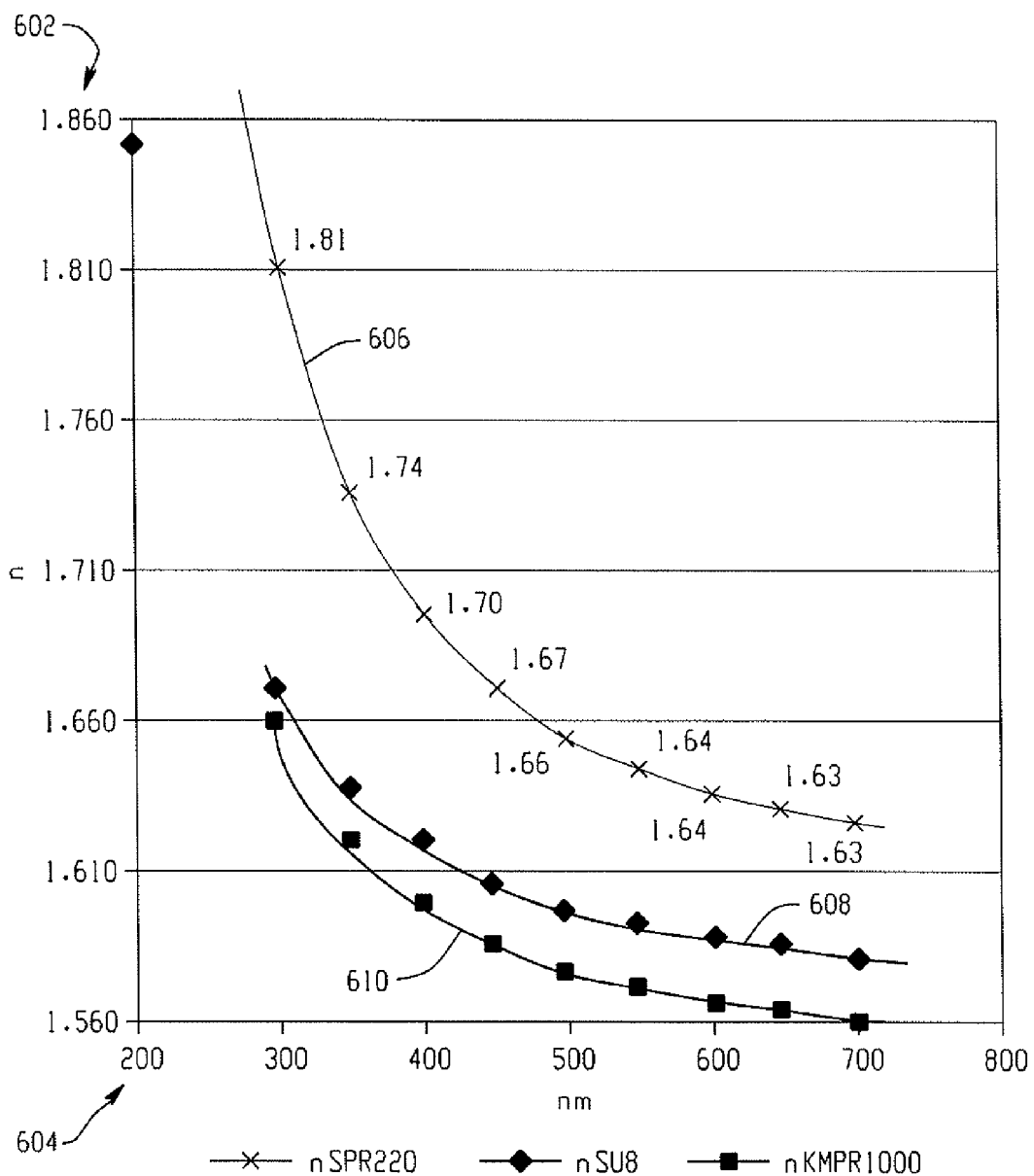
FIG. 6 illustrates curves for various micro-electronic photo-resists, showing refractive index as a function of wavelength.

FIG. 6 shows refractive index profiles or curves, as a function of wavelength, for example non-limiting photo-resists that can be included in the composite scintillator layer 112. A first or y-axis 602 represents the refractive index, n, and a second or x-axis 604 represents wavelength $\lambda$, in units of nanometers (nm). A first curve 606 depicts the behavior of the refractive index of a first photo-resist, SPR® 220, which is a product of Shipley Co., LLC, USA. As shown, SPR® 220 has a relatively high refractive index within the UV portion of the electromagnetic spectrum, such as a refractive index between 1.9 and 1.7 in a sub-range of the UV portion from about 300 nm to about 400 nm. A second curve 608 depicts the behavior of the refractive index of a second photo-resist, SU-8, and a third curve 610 depicts the behavior of the refractive index of a third photo-resist, KMPR® 1000, both products of Micro-Chem Corp., USA. From the curves 608 and 610, both SU-8 and KMPR® 1000 have refractive indexes of between about 1.7 and 1.6 for the sub-range of about 300 nm to about 400 nm.

Table 1 below shows various scintillators with refractive indexes in the range of about 1.6 to 2.0 for the sub-range from about 200 nm to about 400 nm and that can be included in the composite scintillator layer 112. Such scintillators can be immersed in the above-noted photo-resists or other photo-resists to form the composite scintillator layer 112. Other suitable scintillators include, but are not limited to, LuPO4:Pr (emission max ~235 nm), LuBO3:Pr (emission max ~255 nm), YBO3:Pr (emission max ~260 nm), Lu2SiO5:Pr (emission max ~260 nm), LaCl3—GdCl3 (emission max ~260 nm), and/or other scintillators with a refractive index between 1.6 and 2.0 in the UV range. Another suitable scintillator includes LaF3:Ce, which has a light output of 4400 photons/MeV where the fraction of Ce is 100%, a light output of 1900 photons/MeV where the fraction of Ce is 50%, a light output of 2200 photons/MeV where the fraction of Ce is 10%, a light output of 400 photons/MeV where the fraction of Ce is 1%, and a light output of less than 200 photons/MeV where the fraction of Ce is 0.01%. Lanthanum fluoride has a refractive index within 3% of that of SU-8 in the UV wavelength range.

TABLE 1

Refractive index for various scintillators emitting in the UV range.

| Material | Index of refraction (at $l_{max}$) | Emission max. [nm] | Light output [phot./MeV] |
|---|---|---|---|
| LuPO4:Pr | 1.7 | 235 | 17,000 |
| LuBO3:Pr | 1.9 | 255 | 10,000 |
| YBO3:Pr | 1.9 | 260 | |
| Lu2SiO5:Pr | 1.82 | 260 | |
| LaCl3—GdCl3 | 1.9 | 260 | 48000 |
| LuF3:Ce | 1.85 | 310 | 8000 |
| Lu3Al5O12:Pr | 1.85 | 310 | 24000 |
| LaCl3:Ce | 1.90 | 330 | 49000 |
| YAlO3:Ce | 1.95 | 350 | 17000 |
| LaBr3:Ce | 1.89 | 358 | 61000 |
| LuPO4:Ce | 1.675 | 360 | 17000 |
| LuAlO3:Ce | 1.90 | 365 | 12000 |
| Lu2Si2O7:Ce | 1.82 | 380 | 30000 |
| CeBr3—PrBr3 | 1.89 | 385 | 65000 |

FIG. 7 illustrates a method for forming a particular composite scintillator material with a high refractive index (n>1.75) and a scintillator/resist refractive index mismatch of less than 8%. In this example, the scintillator is LaCl3:Ce, which emits over 49,000 photons per MeV (similar to the GOS:Pr,Ce) at 330 nm, and the photo-resist is SPR® 220.

At 702, the scintillator is prepared. This may include using a wet chemistry technique to prepare the scintillator. At 704, the scintillator is powdered. This may include milling the scintillator for twenty-four hours in a three-ball mill and then drying the milled scintillator, and annealing it e.g. at temperatures between 700° C.-1300° C. and desagglomerating it mildly afterwards. At 706, the powdered scintillator is dispersed in the photo-resist. This may include dispersing the powdered scintillator in the photo-resist at about 50 wt/wt scintillator/photo-resist concentration. In other embodiments, other concentrations such as 80/20 wt/wt can be used. In one instance, the powdered scintillator is dispersed in the photo-resist after the photo-resist solvent is evaporated. At 708, the slurry is de-aerated. This may be achieved through de-aerating the slurry for about 3 hours under a coarse vacuum of about 1 torr to remove dissolved gases that may otherwise appear as bubbles, which can cause spectral non-linearity in the x-ray image, and may also result in undesired light scattering.

FIG. 8 illustrates a method for applying the composite scintillator 112 of FIG. 7 to the substrate 202. At 802, the substrate 202 is primed. This may include vacuum vapor priming at 120° C. for about 30 seconds with concentrated HMDS hexamethyldisilizane, and depositing the wavelength shifter layer 116 and/or filter layer 118 on the substrate 202. At 804, the de-aerated slurry is applied to the substrate 202. A relatively thick slurry can be applied to the substrate 202 using various techniques such as screen printing, spin coating, etc. In one instance, the thickness of the slurry is about 10 to 40 microns such as 20 microns. For large dixel sizes, for example, greater than 1 mm, the thickness of the slurry can be up to 120 microns. With spin coating, the slurry can be spin coated for 60 seconds at 2000 or greater RPM. At 806, the coated substrate 202 is baked. In one non-limiting embodiment, this includes heating the coated substrate 202 at about 0.05° C./second up to about 115° C., and holding the temperature at 115° C. for about 2 minutes. The coated substrate 202 can be heated on a hot plate or the like.

At 808, the baked substrate 202 is exposed. In one instance, this may include using a template to cast shadows on the regions of the array between scintillator dixels. This can be achieved using UVA-VIS light in a range of about 350-450 nm, at 250 mJ/cm². UV light that would stimulate emission from the scintillator should not be used.

At 810, the substrate 202 is subject to a hold process. This may include holding the substrate 202 for about 60 minutes in ambient >55% RH. This process allows atmospheric moisture to diffuse back into the photo-resist. At 812, a post-exposure bake is performed on the substrate 202. This may include heating the exposed substrate 202 on a hot plate or the like at about 1° C./second to about 115° C., and thereafter holding the substrate 202 on the hot plate for about 2 minutes.

At 814, the substrate 202 is cooled. This may include natural cooling or forced air cooling with dust free air to room temperature. Very thick layers must be cooled slowly by setting the substrate 202 in a dry cupboard for about 15 minutes. At 816, the resist is etched, for example, using a Bosch etching process.

At 818, if the desired thickness of the composite scintillator layer 112 has not been reached, then steps 804 through 818 are repeated. By way of example, for a desired thickness of 3 mm, steps 804 to 818 would have to be repeated about 150 times to form a 3 mm thick scintillator when the slurry is applied with a thickness of about 20 microns. The repeating of the steps can be performed automatically, for example, on a rotary table. Once the desired thickness is reached, at 820 the etched gaps are filled. In one instance, the gaps are filled with a white reflector such as a reflector including a heavy element such as $BaSO_4$ dispersed in PDVF, which provides a stable white matrix for the dixels and can prevent optical cross-talk at UV and visible wavelengths. At 822, the substrate 202 is cured. This may include increasing the temperature at 1° C./min to about 80° C., and maintaining the temperature at 80° C. for about 15 minutes. At 824, a reflective coating can be applied on the top of the scintillator. For instance, a 0.10-0.40 mm such as a 0.25 mm layer of a white plastic can be glued on with an epoxy or self adhesive. Alternatively, a mirror can be applied, which may reduce undesired X-ray absorption in the reflective layer.

Figures 9, 10:
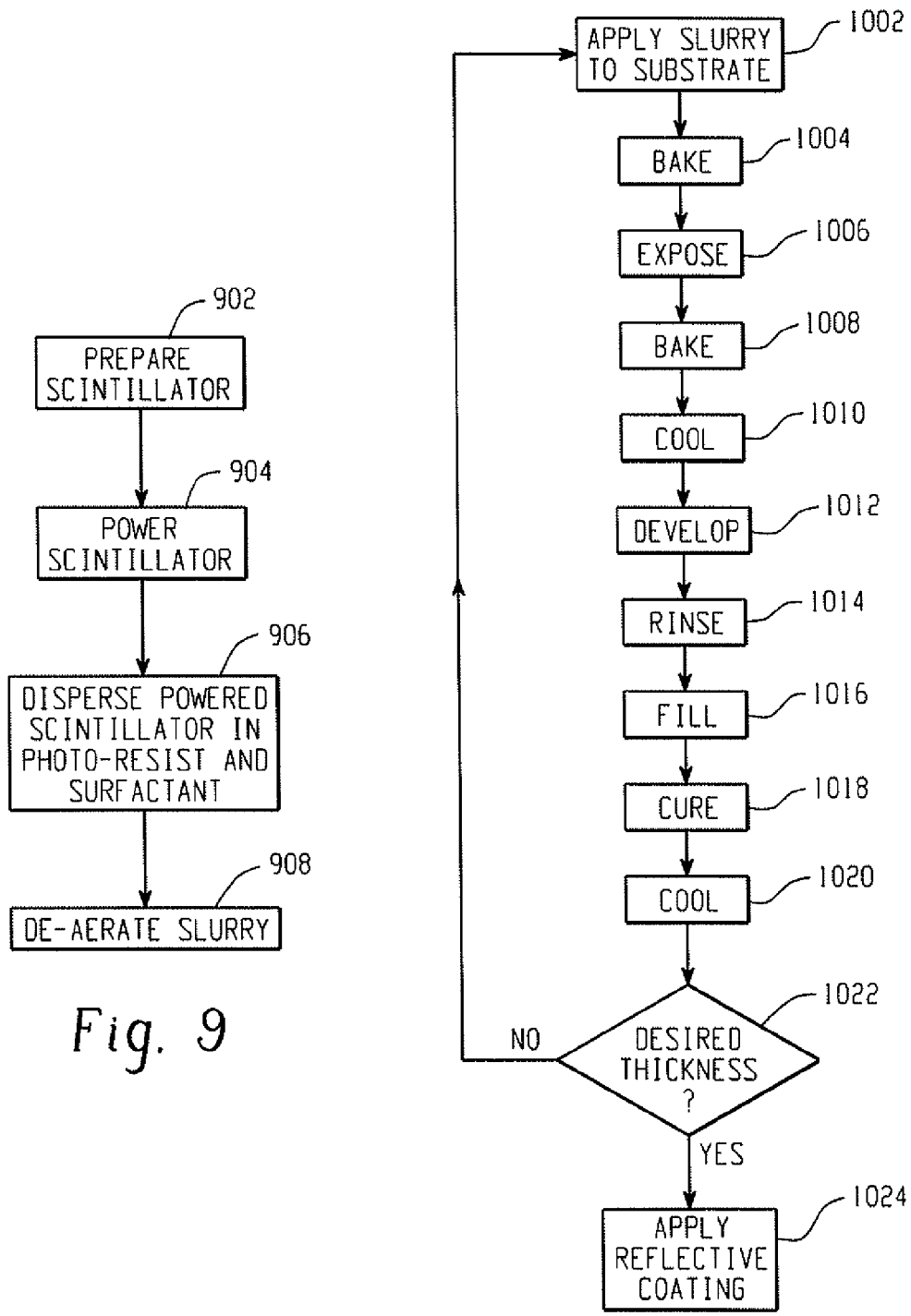

FIG. 9 illustrates a method for forming a particular composite scintillator material with a high refractive index (n<1.75) and a scintillator/resist refractive index mismatch of less than 2%. In this example, the scintillator is $LuPO_4$:Ce, which emits over 17,000 photons per MeV at 360 nm, and the photo-resist is SU-8.

At 902, a scintillator is prepared. Likewise, this may include using a wet chemistry technique. At 904, the scintillator is powdered. This may include milling the scintillator for twenty-four hours in a three-ball mill and the drying the milled scintillator, possibly followed by an annealing step at e.g. 800° C. to restore the light yield of the scintillator, and annealing it e.g. at temperatures between 700° C.-1300° C. and desagglomerating it mildly afterwards. At 906, the powdered scintillator is dispersed in the photo-resist. This may include dispersing the powdered scintillator in the photo-resist at about 50 wt/wt concentration. In other embodiments, other wt/wt concentrations can be used. A surfactant or the like may also be added. For instance, the mixture may include a 0.001 to 0.100% surfactant such as 0.010% surfactant. A suitable surfactant includes, but is not limited to, a polymeric fluorinated surfactant such as 3M™ Fluorosurfactant FC-4430, which is a product of 3M, USA. At 908, the slurry is de-aerated. In one instance, this is achieved through de-aerating the slurry for several hours under a coarse vacuum of about 1 torr to remove dissolved air that may otherwise appear as bubbles, which can cause spectral non-linearity in the x-ray image, and may also result in undesired light scattering.

FIG. 10 illustrates a method for applying the composite scintillator 112 of FIG. 9 to the substrate 202. At 1002, the de-aerated slurry is applied to the substrate 202, which is first primed and covered with a layer of epoxy that includes the wavelength shifter 116 and/or filter 118. A relatively thick slurry can be applied to the substrate 202 using various techniques such as screen printing, spin coating, etc. In one instance, the thickness of the slurry is about 80 to 120 microns such as 100 microns. For thick dixel sizes, such as dixel sizes above 1 mm, the slurry thickness may be up to 220 microns. With spin coating, the slurry can be spin coated for 60 seconds at 2000 or greater RPM. At 1004, the coated substrate 202 is baked. In one non-limiting embodiment, this includes heating the coated substrate 202 at about 0.05° C./second up to about 115° C., and holding the temperature at 115° C. for about 5 minutes. The coated substrate 202 can be heated on a hot plate or the like.

At 1006, the baked coated substrate 202 is exposed. In one instance, this may include using a template to cast shadows on the regions of the substrate 202 between scintillator dixels. This can be achieved using UV/Blue light in a range of about 350-450 nm, at 250 mJ/cm². At 1008, a post-exposure bake is performed. This may include heating the exposed substrate 202 on a hot plate or the like at about 1° C./second to about 55° C., and thereafter holding the substrate 202 on the hot plate for about 5 minutes. At 1010, the substrate 202 is cooled. This may include natural cooling or forced air cooling with dust free air to room temperature. This can be done by setting the substrate 202 in a dry cupboard for about 15 minutes. At 1012, the resist is developed. In one instance, an epoxy based developer, such as a SU-8 developer like 1-Methoxy-2-propanol acetate solvent or other SU-8 developer, can be used to develop the resist. This may include washing the substrate 202 in an ultrasonic bath for about 10 minutes.

At 1014, the substrate 202 is rinsed. This may include washing the substrate 202 with fresh developer solution for about 10 seconds and with iso-propyl alcohol for 10 seconds. At 1016, the gaps or material free regions are filled. In one instance, the gaps are filled with a white reflector such as a reflector including a heavy element such as BaSO4 dispersed in PDVF, which provides a stable white matrix for the dixels and can prevent optical cross-talk at UV and visible wavelengths. At 1018, the substrate 202 is cured. This may include increasing the temperature at 1° C./min to about 80° C., and maintaining the temperature at 80° C. for about 15 minutes. At 1020, the substrate 202 is cooled. This may include natural cooling or forced air cooling with dust free air to room temperature by setting the substrate 202 in a dry cupboard for about 10 minutes.

As noted above, the coating thickness is about 100 microns. At 1022, if the desired thickness has not been reached, then steps 1002 through 1022 are repeated. By way of example, for a desired thickness of 5 mm, steps 1002 to 1022 are repeated about 50 times to form a 5 mm thick scintillator with coating thickness of about 100 microns. This can be done automatically, for example, on a rotary table. Once the desired thickness is reached, at 1024 a reflective coating can be applied on the top of the composite scintillator layer 114. For instance, a 0.10-0.40 mm such as a 0.25 mm layer of a white plastic can be glued on with an epoxy or self adhesive.

The examples of FIGS. 7-10 are provided for explanatory purposes and are not limiting. It is to be understood that other scintillator materials and photo-resists, and other steps can be employed.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method for forming a detector including a composite scintillator layer, comprising: successively depositing a plurality of layers of a composite scintillator material on a radiation detector substrate, which includes one or more photosensors via micro-electronics technology until an aggregate thickness of the plurality of layers of the composite scintillator material reaches a pre-set thickness; wherein the composite scintillator material includes a mixture of a powdered scintillator and a photo-resist, and the composite material produces ultraviolet light.

2. The method of claim 1, further including smoothing a side wall of the plurality of layers of the composite scintillator material.

3. The method of claim 2, further including forming one of a specular mirror, a fiber optic or a light guide on the smoothed side wall.

4. The method of claim 1, further including forming a wavelength shifter layer on the substrate, wherein the plurality of layers of the composite material is deposited on the wavelength shifter layer, and the wavelength shifter layer converts light of a first wavelength produced by the plurality of layers of the composite material into light of a second wavelength that corresponds to the spectral sensitivity of the one or more photosensors.

5. The method of claim 4, further including: forming a wavelength filter layer on the wavelength shifter layer, wherein the plurality of layers of the composite material is deposited on the wavelength filter layer, and the wavelength filter layer passes light of the first wavelength only.

6. The method of claim 1, wherein the one or more photosensors have a spectral sensitivity that matches a wavelength of light produced by the plurality of layers of the composite material.

7. The method of claim 1, wherein the photo-resist includes a photo-resist used in micro-electromechanical systems production.

8. The method of claim 1, wherein the composite scintillator layer includes a plurality of scintillator dixels, and further including filing the gaps between the scintillator dixels with a mixture of a higher refractive index colorless powder immersed in a lower refractive index resin.

9. The method of claim 1, wherein the composite scintillator layer has a decay time of less than 40 nanoseconds.

10. The method of claim 1, wherein the powdered scintillator and the photo-resist have refractive indexes in a range between 1.6 and 2.0 in the ultraviolet portion of the electromagnetic spectrum.

11. The method of claim 1, the refractive index mismatch between the powdered scintillator and the photo-resist is less than ten percent.

* * * * *